April 12, 1966  A. J. SUMMERS  3,245,352
AIRCRAFT
Filed Jan. 30, 1958
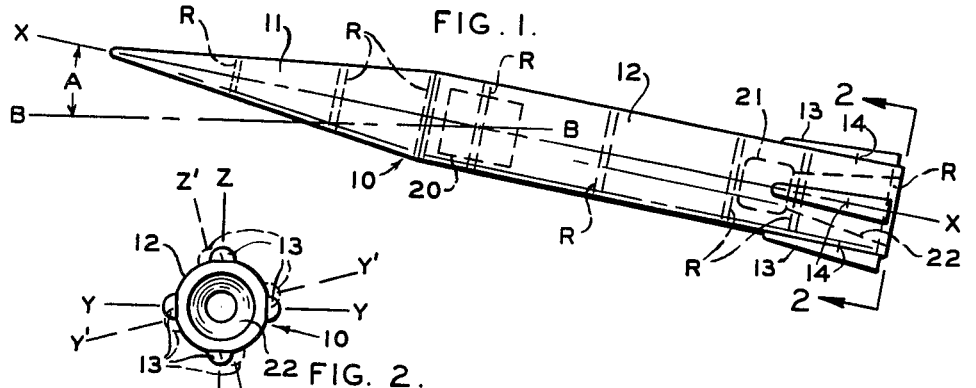
FIG. 1.
FIG. 2.
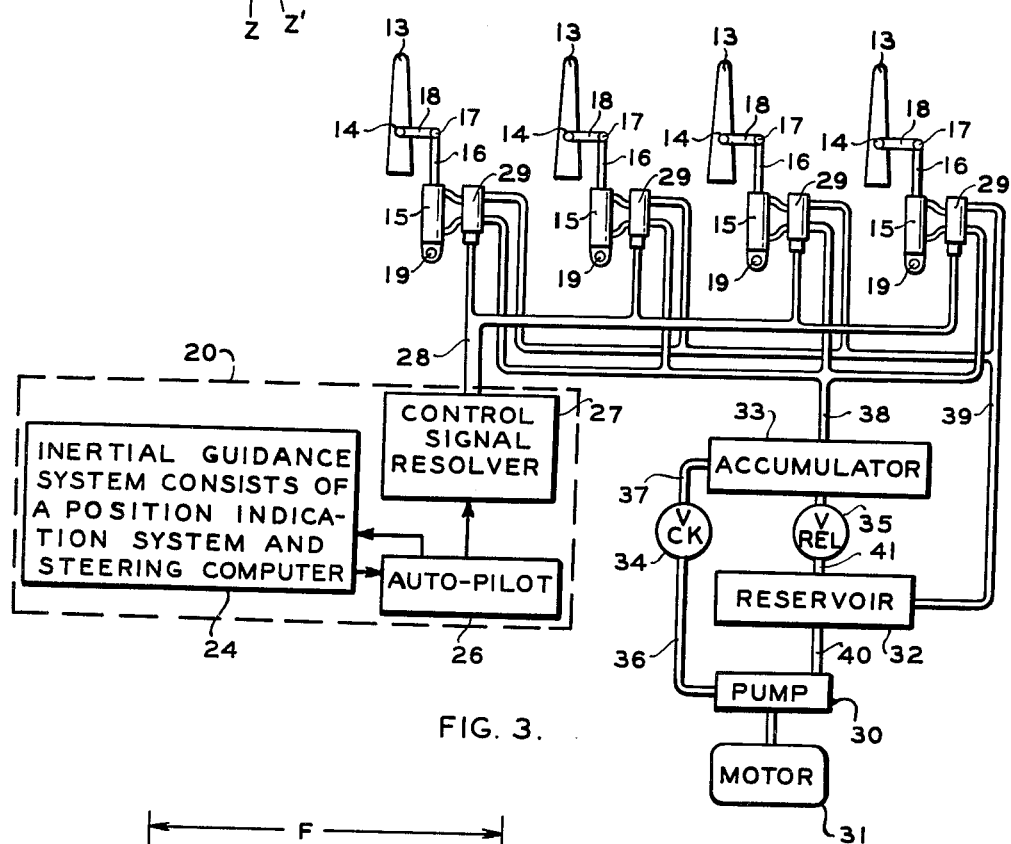
FIG. 3.
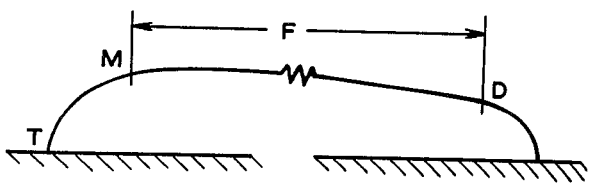
FIG. 4.
INVENTOR.
ALLAN J. SUMMERS
BY
Gravely, Lieder & Woodruff
ATTORNEYS 3,245,352
AIRCRAFT
Allan J. Summers, Kirkwood, Mo., assignor to McDonnell Aircraft Corporation, St. Louis, Mo., a corporation of Maryland
Filed Jan. 30, 1958, Ser. No. 712,060
5 Claims. (Cl. 102—51)

This invention relates to an aircraft or flying vehicle, such as a manned aircraft or a guided missile, and more particularly to a vehicle producing aerodynamic lift and flying at such speeds and altitudes that aerodynamic heating of the airframe structure is a significant problem.

Aircraft bodies of the general character herein contemplated may be divided into the ballistic missile types and the glide rocket types. A missile, or ballistic missile, may be thought of as a pilotless weapon or object capable of being projected into space to follow an elliptical path in which the range along the earth's surface is a function of the angle of take-off and the speed. The glide rocket is an aircraft in which aerodynamic lift is developed during flight by control means constantly effective to pitch the aircraft into an angle of attack attitude such that the flight path materially differs from the missile due to the glide characteristics.

In a ballistic missile body the range to be attained is developed by projecting the body along an elliptical path of substantial altitude beyond that required for a glide aircraft. Aircraft bodies of the missile type are subject to the problem of excessive heating due to skin friction and aerodynamic forces. It has been thought that special high temperature resistant materials and a substantial airframe structure would overcome the aerodynamic heating problem, and much work has been directed to developing materials for this purpose in spite of the cost. While availability of special materials has handicapped technological advances, there are also the companion problems of maintaining structural integrity at supersonic velocities so that the aircraft will hold to a desired flight path, and of choosing a structural design to obtain adequate fuel and load capacity for the end in view. So far as it is known at the present time, costly and hard to obtain materials and structural design criteria have imposed severe handicaps upon realizing a satisfactory vehicle. Those skilled in this art are well aware of the problems to be overcome before a successful supersonic aircraft may be attained within the realm of economic considerations.

Present knowledge concerning missile construction dictates that the missile must be protected in some manner against thermal stresses and heat destruction during the out-going flight and upon re-entry into the sensible atmosphere. The availability of special materials for missiles is a problem which has not yet been reduced in magnitude or importance.

It is appreciated by those skilled in this art of supersonic or very high speed aircraft that a small angle of attack will provide aerodynamic lift. The advantage of such lift is that the launching energy can be expended during glide flight to obtain a greater range. Thermal problems are also present with glide aircraft which fly within the sensible atmosphere and move at supersonic velocity. It is the aim hereof to overcome the material problem and also avoid thermal stresses and heat destruction effects by the method and means of controlling the aircraft at all times in a unique manner hereinafter explained.

It is, therefore, an important object of this invention to overcome the foregoing problems in providing a supersonic aircraft having improved flight characteristics at low cost and with readily available materials.

It is an object of this invention to roll the aircraft continuously or at a steady or controlled rate other than zero during flight to cause essentially uniform heating around the circumference of the body, whereby peak structural temperatures incurred in supersonic flight are reduced and thermal gradients are minimized as compared with similar non-rolling aircraft under the same flight conditions.

A further object of the invention is to provide flight control means which will cause the aircraft to rotate or roll during flight and thereby preserve the aircraft from heat destruction and to improve control.

An object hereof is to control the flight of a supersonic aircraft so that an efficient and simple, low cost airframe can be provided, and so that the advantages of a relatively dense configuration of airframe, as opposed to high aspect ratio and thin surface bodies, may be obtained for control of heat build-up.

A further object of the invention is to provide a wingless type airframe configuration of simple form and to combine with the airframe a control system which will produce glide flight characteristics and a rate of roll to more uniformly distribute the aerodynamic heating effects and lessen peak temperatures.

Still further objects of the invention are to provide a new and useful combination of airframe configuration and control means whereby the principles of glide flight may be utilized with a control system to reduce the destructive heating effects encountered at supersonic velocities.

A preferred embodiment of the present invention comprises an airframe of dense configuration having a longitudinal axis of symmetry, controllable means carried by the airframe so as to be operative at all times during the flight program to exert desired aerodynamic reactions upon the airframe in its principal axes, such as in pitch, yaw and roll, and control means for regulating the controllable means in a predetermined manner for obtaining glide flight characteristics and a rate of roll, whereby a simple airframe structure composed of relatively low cost materials can be employed to yield a glide flight path at the supersonic speeds desired without incurring the destructive effects of thermal stresses and aerodynamic heating upon the airframe.

The glide flight characteristic is obtained by pitching the nose up so that a desired angle of attack is effected. Optimum flight characteristics may be obtained by a varying angle of attack. Angle of attack is defined as the acute angle formed between a fixed reference line in the aircraft body (the longitudinal axis) and the line of the relative wind direction projected on a vertical plane containing said reference line.

The invention also consists in the parts and combinations thereof which will be more fully described hereinafter, or which may be reasonably inferred from an understanding of the details now to be set forth in the drawings and description thereof.

In the drawings:
FIG. 1 is a longitudinal elevational view of an aircraft having the configuration and characteristics for carrying the invention into practice;
FIG. 2 is an end view taken at line 2—2 in FIG. 1;
FIG. 3 is a diagrammatic view of a system for controlling the aircraft of FIG. 1; and
FIG. 4 is a graph showing a flight path for the aircraft of the invention.

In FIGS. 1 and 2, the aircraft 10 herein contemplated comprises a body of revolution having a longitudinal or principal axis of symmetry $x$—$x$. A simple form of body is one having a nose section 11 of conic configuration and an aft section 12 of cylindric configuration. These sections are constructed of relatively low cost, high temperature resistant material. The material in sheet form is shaped to the desired contour and retained by internal hoop-type ribs R spaced along the axis $x$—$x$ as desired to sustain the same. Internal pressurization is resorted to for preventing collapse and distortion. While the cone and cylinder form are illustrated, for simplicity of illustration it should be understood that it is given without limitation, as other forms with equivalent axial symmetry may be adopted.

The unique advantages of the invention are seen to be embodied in the provision of movable projecting surfaces 13 mounted adjacent the aft end of the body section 12 and movable about suitable pivot axes 14, each of which extends inwardly and is operatively connected to an actuator 15 through an actuator arm 16, in turn, pivotally connected at 17 to the crank arm 18 for the surface 13. The actuator 15 for each surface 13 is swingably supported at pivot 19 so that the crank arm 18 may swing about its pivot axis 14. The surfaces 13 are made to be free of flutter reactions in known manner. The unique combination also embodies a guidance and control system which is diagrammatically represented at 20 in FIGS. 1 and 3. The effect of the system 20 is to transmit control signals in a feed back loop to the actuators 15 for the control surfaces 13, whereby the aircraft is caused to assume a desired angle of attack A to the axis B—B of the relative wind, and to roll about the axis of symmetry $x$—$x$ at a rate of the order of from 15 to 25 revolutions per minute.

Launching of the aircraft 10 is achieved in any of several ways, such as by reaction motors suitably attached to the structure and released at burn-out, or by one or more stages of thrust reaction bodies arranged in axial extension of the body section 12 and releasibly connected thereto. For present purpose of illustration only, a reaction motor 21 is shown in phantom outline within the section 12, the exhaust nozzle 22 thereof being directed through the aft end of this section.

The advantage of aerodynamic lift, as pointed out above, is lost if the heating factor of supersonic velocity is not controlled. For example, aerodynamic lift causes heat build-up at the bottom surface of the aircraft (FIG. 1) where the pressure is large. The heat build-up results in a large temperature differential between the bottom and top surface areas and this causes thermal stresses which distort the structure so that accurate flight control is not obtained. It is possible to overcome in some measure the thermal stress by employing a heavy airframe structure, but this is accomplished only at the expense of the fuel load and increase in overall size. Size and weight, therefore, are limited by the conveyances and apparatus for moving and handling the airframe structure, and maximum limits are necessary.

A relatively small, light weight aircraft structure is highly advantageous and can be obtained by the principles herein set forth. The aerodynamic heating effect and its resultant large temperature gradient from bottom to top of the aircraft 10, as well as the peak temperature in the material, is substantially reduced by rolling the airframe structure about its axis of symmetry $x$—$x$ so that the heat input at the bottom is distributed over the peripheral surface and heat loss in radiation is increased. The rolling action is obtained (FIG. 1) by combining with the angle of attack control of the surfaces 13, a control action causing the airframe to roll on the axis $x$—$x$ so that the surfaces of the cone section 11 and cylinder section 12 continuously pass through the bottom position and carry the heat toward the top position so that heat is distributed and heat loss through radiation is encouraged.

One control system for carrying the invention into practice is shown diagrammatically in FIG. 3, wherein known control components have been applied in a new and useful manner. Since the components are individually well known and have well defined functions, for other than the purposes of this improvement, it is believed unnecessary to give details thereof. The control system 20 is provided with an inertial guidance system 24 consisting of a position indicating system and steering computer which generates signal impulses to maintain the aircraft on a desired flight path from take-off T (FIG. 4) through the burnout point M of the reaction motor, such as motor 21 or its equivalent as heretofore pointed out, and into the desired glide flight path F to the dive point D at the target. These signals are fed to an auto-pilot 26. The auto-pilot, in turn, transmits signals to a signal resolver device 27 which then emits the final series of control signals through the closed loop network of circuits, represented by the conduit 28, to the several control units 29 associated with the actuators 15.

More specifically, the guidance and control system 24 contains an inertial reference device, such as the well known stabilized platform, or set of free gyroscopes, and continuously derives steering instructions for the aircraft in the chosen space-reference axes $y$—$y$ and $z$—$z$, as shown in FIGS. 1 and 2. By means of techniques well known to the art and, therefore, not believed necessary to show in detail, the system 24 and the resolver 27 resolves the space-referenced steering instructions or signals into the control axes $y'$—$y'$ and $z'$—$z'$ by use of angle measurements derived from the inertial reference device. The guidance and control system incorporates a roll-rate stabilization function making use of devices such as rate gyroscopes in a manner familiar to the missile guidance art, with the unique exception that the system is adjusted to roll-stabilize the aircraft 10 at a preselected rate of roll other than zero. By the application of this invention, a supersonic aircraft may be constructed and operated with greatly reduced structural weight and, hence, greatly reduced overall weight and cost, as compared with an otherwise similar aircraft designed to do the same job, but without the application of this invention.

Still referring to FIG. 3, the actuators 15 are supplied with pressure fluid from a suitable fluid pressure system comprising a pump 30 driven by motor 31, a suction reservoir 32, a pressure accumulator 33, and a check valve 34 and pressure relief or by-pass valve 35. The pressure fluid flow is along the feed conduit 36 to valve 34 and through conduit 37 and accumulator 33 to the supply conduit system 38 to each of the units 29. The return system 39 leads back to the reservoir 32 and to the pump suction conduit 40. Should excessive pressure develop a by-pass valve 35 operates to relieve the pressure by opening conduit 41 between the accumulator 33 and the reservoir 32, as is well known.

The action of the control signals transmitted in the network circuits 28 is to move the several control surfaces 13 in a desired direction and to a desired angular position, which may be positive, negative, or zero in effect, to maintain the aircraft 10 on course, at the desired angle of attack and with the desired rate of roll. The rate of roll function derived from adjusting surfaces 13 is a unique addition to the combination of other control functions, and the advantages therefor should now be understood and appreciated.

Turning to FIG. 2, the aircraft 10 is shown with the surfaces 13 in the $y$—$y$ and $z$—$z$ axes at a given instant. Since the aircraft 10 is caused to roll about its symmetrical axis $x$—$x$, the surfaces on the $z$—$z$ axis are angularly displaced about pivots 14 to produce the roll, and the surfaces on the $y$—$y$ axis are, therefore, angular displaced to cause angle of attack and have an additional differential displacement relative to one another to cause roll. As the roll moves the several surfaces 13 to the axes $y'$—$y'$ and $z'$—$z'$, the surfaces on the $z'$—$z'$ axis become responsive to the angle of attack function, and the surfaces on the $y'$—$y'$ axis become less responsive to the angle of attack function and more responsive to the roll function. Of course, all of the surfaces 13 are also responsive to the additional control function of maintaining a desired flight path and, as such, jointly or severally steer the aircraft. It is seen that the control surfaces 13 are caused to respond to the control system 20 in a periodic manner to cause the desired rolling control function to be superimposed upon the control functions, and these control functions are interrelated to correct for deviations from the flight path F.

The foregoing description has been given by way of example of a presently preferred embodiment of the invention, but it should be understood that equivalents of the specific means, devices and components pointed out may be substituted therefor without departing from the spirit and scope of the invention as set forth in the appended claims.

What is claimed is:

1. An aircraft comprising a body of revolution having a longitudinal axis of symmetry, flight control surfaces pivotally carried by said body to move to positions exerting aerodynamic forces on the body so as to cause the body to effect an angle of attack attitude along the axis of symmetry, and a control system operative periodically on said control surfaces to superimpose upon the angle of attack movement thereof other aerodynamic forces causing said body to continuously roll about the axis of symmetry at a rate other than zero.

2. In an aircraft of the supersonic velocity class, the combination of a body of revolution having a longitudinal axis of symmetry, movable control surfaces carried by said body in circumferentially spaced relation on the exterior thereof, and motor means in said body operatively connected to said control surfaces to move the latter periodically to cause said body to effect an angle of attack for glide flight and to continuously roll said body about said longitudinal axis of symmetry during glide flight at a rate of the order of from 15 to 25 revolutions per minute to distribute the aerodynamic heating effect uniformly around said body.

3. A flying vehicle comprising an elongated body of revolution having an axis of symmetry in the direction of flight, movable control elements carried by said body in positions spaced about the circumference thereof to cause said body to effect a flight attitude with its axis of symmetry at an angle of attack to the relative wind, thrust producing means carried by said body to drive the body at supersonic velocity and generate aerodynamic lift at said angle of attack attitude, and motor means operatively connected to said movable control elements to move the latter and cause said elements to move periodically to positions angularly related to said axis of symmetry effecting a continuous rolling response of said body about its axis of symmetry, and to move periodically to other positions to cause said body to assume an angle of attack, whereby the heating of the body due to aerodynamic lift is uniformly distributed about said body.

4. A flying vehicle comprising an elongated body of revolution having an axis of symmetry in the direction of flight, control elements movably carried by said body in positions spaced about the circumference thereof to cause said body to assume a flight attitude with its axis of symmetry at an angle of attack to the relative wind, thrust producing means carried by said body to propel the body at supersonic velocity and generate aerodynamic lift at said angle of attack attitude, and motor means operatively connected to said elements to move the same to cause said body to continuously roll about its axis of symmetry at a steady rate, and to cause said body to assume an angle of attack for generating aerodynamic lift, the rolling of said body by said control elements carrying said control elements through positions on true vertical and horizontal reference axes and positions intermediate the reference axes, whereby said control elements exert periodically more or less response to cause the angle of attack attitude and body roll.

5. In a flying missile, a body having a tapering nose section and a substantially cylindrical aft section, said body being symmetrical about a longitudinal axis, propulsion means in said aft section propelling said body by thrust reaction rearwardly thereof, two pairs of control surfaces on said body adjacent said propulsion means, each surface being elongated in the direction of said symmetrical axis and all of said surfaces being arranged about the body aft section in equal spaced relation, one of said pairs of surfaces at times being in a vertical plane relative to said axis of symmetry and the other pair being in a horizontal plane relative to said axis of symmetry, pivot means connecting each of said surfaces to said body for movement at times to positions of angularity relative to said axis of symmetry, and motor means connected to each of said pivot means, certain of said motor means causing one pair of surfaces when in the vertical plane to assume opposite angular positions to roll said body about said axis of symmetry, and others of said motor means causing the other pair of surfaces when in the horizontal plane to assume the same angular positions to impart an angle of attack for said body, and all of said motor means periodically angularly moving said pairs of surfaces in varying degrees between said same angular positions in the horizontal plane and opposite angular positions in the vertical plane to continuously impart a substantially steady state of body roll and a substantially steady state of angle of attack to obtain glide flight and distribute aerodynamic heating about said body.

References Cited by the Examiner

UNITED STATES PATENTS

| | | | |
|---|---|---|---|
| 2,421,085 | 5/1947 | Rylsky | 102—3 |
| 2,884,540 | 4/1959 | Shockley | 244—14 X |

FOREIGN PATENTS 704,723   2/1954   Great Britain.

BENJAMIN A. BORCHELT, *Primary Examiner.*

SAMUEL BOYD, ARTHUR M. HORTON, SAMUEL FEINBERG, *Examiners.*